Figure 2:
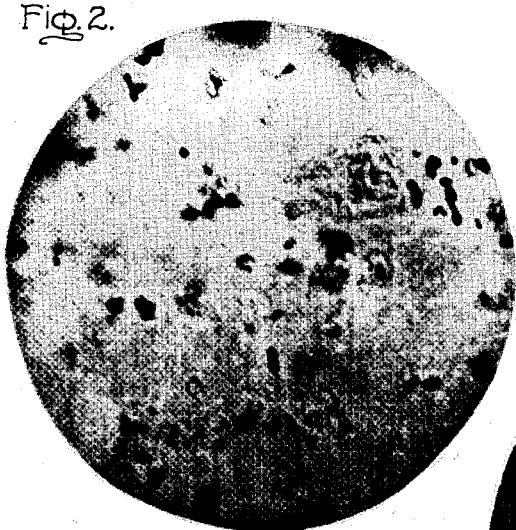

Sept. 29, 1953  J. F. ROSS ET AL  2,653,857
PREPARATION OF CALCIUM FLUORIDE
Filed May 1, 1951

Inventors:
John F. Ross,
Harold W. Sloyer,
by
Their Attorney.

Patented Sept. 29, 1953

2,653,857

UNITED STATES PATENT OFFICE 2,653,857

PREPARATION OF CALCIUM FLUORIDE

John F. Ross, Shaker Heights, and Harold W. Sloyer, Willoughby, Ohio, assignors to General Electric Company, a corporation of New York Application May 1, 1951, Serial No. 223,914

3 Claims. (Cl. 23—88)

Our invention relates to a process for manufacturing calcium fluoride.

Calcium fluoride is one of the ingredients employed in the preparation of calcium halophosphate phosphors such as those disclosed in Patent 2,488,733, McKeag et al., and it is one of the objects of our invention to provide a calcium fluoride salt of high purity and uniformly fine particle size which makes it particularly suitable for such use.

Calcium fluoride may be prepared by reacting calcium carbonate and hydrofluoric acid. However, such a process has the disadvantages of producing a product which is relatively expensive and of non-uniform particle size, and the process requires the handling of hydrofluoric acid which is somewhat hazardous.

Calcium fluoride may also be prepared by the reaction of calcium chloride and ammonium fluoride, but, ordinarily, the resulting salt is so fine in particle sizes that it cannot readily be washed by conventional means.

It is, therefore, a further object of our invention to provide a practical procedure for the preparation of pure calcium fluoride having a particle size which is uniform and fine but, nevertheless, can be thoroughly washed by conventional procedures. It is a further object to provide a process operable under conditions which permit the use of glass-lined vessels which may be operated at elevated temperatures. It is a further object to provide a process which is simple and economical and which produces high yields such as 95–97 per cent.

We have found that the above objects may be attained by a process which employs pure calcium chloride and pure ammonium fluoride as the reactants but under conditions which permit sufficient crystal growth to permit the proper washing of the material. To this end the process consists, in general, of precipitating the calcium fluoride salt at a slow rate, and at the boiling point, by addition of relatively dilute ammonium fluoride solution in the form of fine streams or sprays to an excess of relatively dilute acidified calcium chloride solution. To obtain maximum results, the following conditions should be observed:

(A) The precipitation is conducted at boiling temperature, about 100° C. This promotes crystal growth and also agitates the mixture. Precipitation from a solution at normal temperatures of 25–30° C. produces a product of extremely fine particle size which is very difficult to wash.

(B) An excess of calcium chloride is present at all times. This is desirable in order to protect the glass lining of the reaction kettle. We preferably employ a 10 per cent excess of calcium chloride, although an excess of the order of 25 per cent may be employed satisfactorily. A greater excess of calcium chloride serves no useful purpose; it would be lost in the mother liquor. A small excess of calcium chloride, say one per cent, is considered too low to protect properly the glass-lined vessel. In general, we prefer to keep within the range of 5 to 25 per cent excess of calcium chloride.

(C) The ammonium fluoride should be added in multiple fine streams or sprays to avoid high local concentrations. Otherwise, a product of very fine particle size results. The avoidance of high local concentrations is also assisted by providing efficient agitation of the calcium chloride solution by maintaining it at a boiling temperature, as pointed out above.

(D) The rate of addition of the ammonium fluoride should be slow. We preferably employ flows of about 3 to 3½ liters per minute for 3½ to 4 hours in the production of 120 kilograms of calcium fluoride. Slow precipitation is advantageous in producing a freely filtering and washing cake. This is attributed to affording a limited number of particles an opportunity to grow rather than forming a much larger number of smaller particles by exceeding too greatly the normal growth rate through rapid addition of the fluoride solution.

(E) Precipitation from a dilute solution is advantageous in its effect on permeability of the cake in a centrifuge during the washing operation. Thorough washing is important for the removal of soluble salts and impurities. We prefer to employ a concentration of the calcium chloride of about 165 grams per liter. However, this is not too critical and we may employ concentrations of about 60 to 300 grams per liter. Of lesser importance, but having a slight effect, is the concentration of the ammonium fluoride solution. The ammonium fluoride can be prepared from ammonium bifluoride (105 grams per liter) by neutralizing with 28 per cent ammonia water. It is preferably prepared in a concentration of about 135 grams per liter of normal ammonium fluoride and adjusted with 28 per cent ammonia water to a pH of 6.0 to 6.75 in a final volume of 850 liters. This concentration facilitates control of the distribution unit in providing sufficient volume to maintain satisfactory flow.

(F) The acidity of the reaction mixture is preferably held between 0.05 to 0.25 per cent, as hydrochloric acid, throughout the precipitation. In view of the presence of excess calcium chloride at all times, and the extreme insolubility of calcium fluoride, any acidity present is believed to be hydrochloric acid and not hydrofluoric acid. This condition permits the use of glass-lined equipment. The presence of the free acidity tends to hold iron and other impurities in solution and thus enables their removal during the washing operation.

Figure 3:
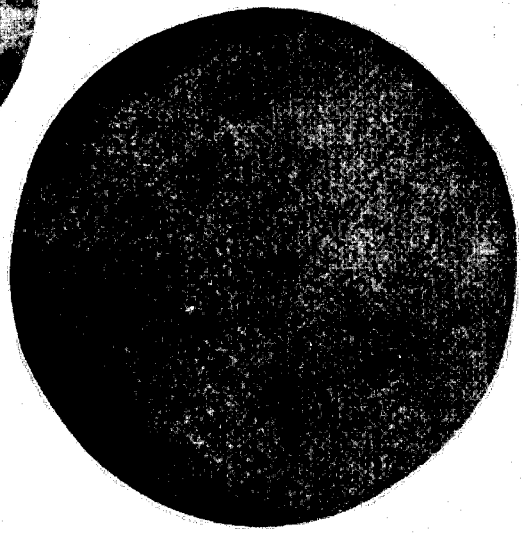
Figure 1:
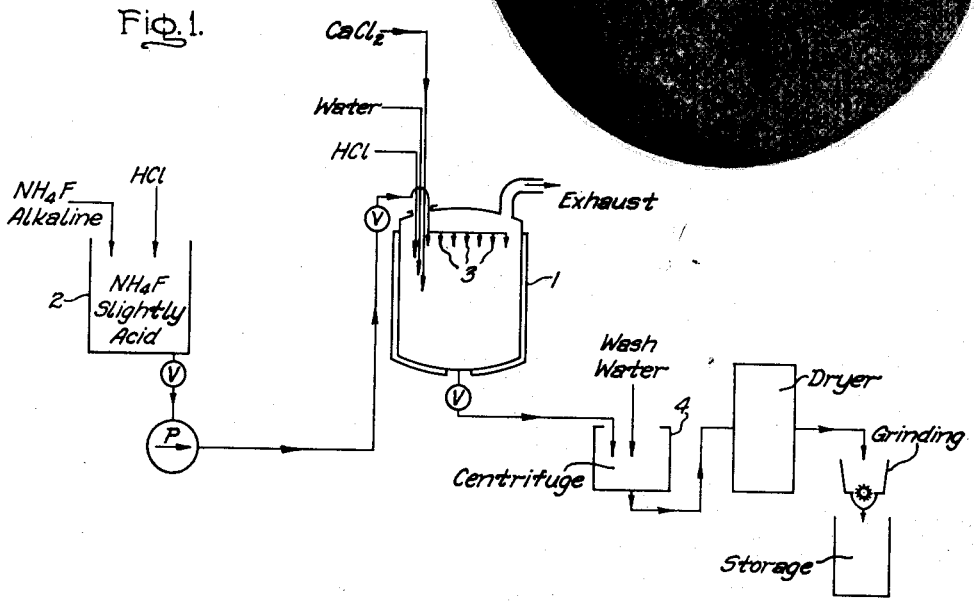

The process will now be described in further detail in connection with the accompanying drawing wherein Fig. 1 is a flow sheet of the process and Figs. 2 and 3 are photomicrographs of the respective products as made by the prior process and by the process of the invention.

About 1200 liters of calcium chloride (165 grams per liter) are placed in a steam-jacketed, glass-lined vessel 1 and heated to boiling. Sufficient concentrated hydrochloric acid is added to give a concentration of 0.10 per cent HCl. About 850 liters of the ammonium fluoride solution (135 grams per liter) are slowly added from a tank 2 through multiple jets 3 in the vessel 1, over a period of 3½ to 4 hours, while the mixture is vigorously boiled. The ammonium fluoride solution may be added at a rate of about 3.5 liters per minute and is continued until all of it has been added. The acidity of the mixture is maintained under control during the entire reaction, preferably between .05 and .15 per cent, and most desirably at about .10 per cent. After completion of the reaction the solution is allowed to stand overnight to cool. The precipitate is thoroughly washed on a suitable filtering device, preferably a centrifuge 4. It is then dried and ground before use.

The product produced in accordance with our invention has a more uniform particle size than a product produced by the process involving reaction of calcium carbonate and hydrofluoric acid. This is illustrated by Figs. 2 and 3 of the drawing which are photomicrographs, at 450 diameters, showing in Fig. 2 the product formed by reaction of calcium carbonate and hydrofluoric acid, and in Fig. 3 the product produced in accordance with our invention. The photomicrograph (Fig. 3) shows the average particle size of the calcium fluoride produced by our process to be about one micron.

The calcium fluoride may be used in the manufacture of halophosphate phosphor. Such phosphors may be made by dry-mixing the calcium fluoride together with calcium carbonate, calcium acid phosphate, manganese carbonate, antimony trioxide and calcium chloride. The mixture is thoroughly blended and fired at a temperature of the order of 1150° C. for a period of the order of an hour.

What we claim as new and desire to secure by Letters Patent of the United States is:

1. The process of preparing a uniformly fine and readily washable form of calcium fluoride by precipitation from solutions of ammonium fluoride and calcium chloride which comprises heating to boiling temperature a quantity of calcium chloride solution having a concentration in the range of about 60 to 300 grams per liter, adding thereto sufficient concentrated hydrochloric acid to give a concentration of about .05 to .25 per cent HCl, adding in the form of a multiple jet spray a quantity of ammonium fluoride solution having a concentration in the order of 135 grams per liter and in a total amount such that the said quantity of calcium chloride is from about 5 to 25 per cent in excess of the amount required to react with the total amount of ammonium fluoride, maintaining the boiling temperature and the said acidity of the mixture throughout the duration of the reaction, and filtering and washing the calcium fluoride precipitate to remove soluble salts and impurities.

2. The process of preparing a uniformly fine and readily washable form of calcium fluoride by precipitation from solutions of ammonium fluoride and calcium chloride which comprises heating to boiling temperature a quantity of calcium chloride solution having a concentration of about 165 grams per liter, adding thereto sufficient concentrated hydrochloric acid to give a concentration of about .10 per cent HCl, adding in the form of a multiple jet spray a quantity of ammonium fluoride solution having a concentration in the order of 135 grams per liter and in a total amount such that the said quantity of calcium chloride is about 10 per cent in excess of the amount required to react with the total amount of ammonium fluoride, maintaining the boiling temperature and the said acidity of the mixture throughout the duration of the reaction, and filtering and washing the calcium fluoride precipitate to remove soluble salts and impurities.

3. The process of preparing a uniformly fine and readily washable form of calcium fluoride by precipitation from solutions of ammonium fluoride and calcium chloride in relative proportions and under the conditions hereinafter stated, which comprises heating to boiling about 1200 liters of calcium chloride solution having a concentration of approximately 165 grams per liter, adding sufficient concentrated hydrochloric acid to give a concentration of about 0.10 per cent HCl, adding about 850 liters of ammonium fluoride solution having a concentration of about 135 grams per liter in the form of a multiple jet spray and at a rate of about 3.5 liters per minute over a period of about 3½ to 4 hours until all of it has been added, maintaining the boiling temperature and also maintaining the acidity of the mixture between about .05 to .15 per cent during the entire reaction, filtering and washing the calcium fluoride precipitate to remove soluble salts and impurities.

JOHN F. ROSS.
HAROLD W. SLOYER.

References Cited in the file of this patent

UNITED STATES PATENTS

| Number | Name | Date |
|---|---|---|
| 1,329,072 | Chase | Jan. 27, 1920 |